United States Patent
Kim

(10) Patent No.: US 10,693,354 B2
(45) Date of Patent: Jun. 23, 2020

(54) METHOD FOR MANUFACTURING IMPELLER ROTOR ASSEMBLY

(71) Applicant: Sunsik Kim, Changwon-si (KR)

(72) Inventor: Sunsik Kim, Changwon-si (KR)

(*) Notice: Subject to any disclaimer, the term of this patent is extended or adjusted under 35 U.S.C. 154(b) by 201 days.

(21) Appl. No.: 15/548,826

(22) PCT Filed: Mar. 8, 2016

(86) PCT No.: PCT/KR2016/002276
§ 371 (c)(1),
(2) Date: Aug. 4, 2017

(87) PCT Pub. No.: WO2016/148419
PCT Pub. Date: Sep. 22, 2016

(65) Prior Publication Data
US 2018/0041100 A1    Feb. 8, 2018

(30) Foreign Application Priority Data
Mar. 17, 2015  (KR) .................... 10-2015-0036452

(51) Int. Cl.
*H02K 15/02* (2006.01)
*H02K 15/10* (2006.01)
*H02K 15/03* (2006.01)
*H02K 7/14* (2006.01)
*H02K 1/27* (2006.01)
(Continued)

(52) U.S. Cl.
CPC ............. *H02K 15/03* (2013.01); *B29C 45/14* (2013.01); *H02K 1/278* (2013.01); *H02K 7/14* (2013.01); *H02K 1/146* (2013.01)

(58) Field of Classification Search
CPC ........ B29C 45/14; H02K 1/278; H02K 1/146; H02K 7/14; H02K 15/03
See application file for complete search history.

(56) References Cited

U.S. PATENT DOCUMENTS

| 9,685,848 B2* | 6/2017 | Song ................ A61H 23/02 |
| 2008/0028870 A1* | 2/2008 | Tokumoto .............. G01L 5/221 |
| | | 73/862.333 |

(Continued)

FOREIGN PATENT DOCUMENTS

| JP | 2004-039822 A | 2/2004 |
| JP | 2014-137088 A | 7/2014 |

(Continued)

OTHER PUBLICATIONS

International Search Report for PCT/KR2016/002276 dated Jun. 27, 2016 from Korean Intellectual Property Office.

*Primary Examiner* — Paul D Kim
(74) *Attorney, Agent, or Firm* — Paratus Law Group, PLLC

(57) ABSTRACT

A method of manufacturing an impeller rotor assembly including: manufacturing a cylindrical magnet in which hollow space is formed; manufacturing a magnet yoke which is assembled on the inner circumferential surface of the magnet in cylindrical form where hollow space is provided, and in which an outer diameter is 0.02 to 0.3 mm smaller than the inner diameter of the magnet; assembling the magnet and magnet yoke; and mold forming in which the assembly of the magnet and magnet yoke is integrated into the mold.

2 Claims, 5 Drawing Sheets

(51) Int. Cl.
 *B29C 45/14* (2006.01)
 *H02K 1/14* (2006.01)

(56) References Cited

U.S. PATENT DOCUMENTS

| | | | |
|---|---|---|---|
| 2009/0151436 A1* | 6/2009 | Nagahori | F02D 9/105 |
| | | | 73/114.36 |
| 2009/0199644 A1* | 8/2009 | Aoyagi | B06B 1/04 |
| | | | 73/654 |
| 2014/0084588 A1 | 3/2014 | Agrawal et al. | |
| 2014/0199189 A1 | 7/2014 | Tamaoka et al. | |
| 2014/0271280 A1 | 9/2014 | Ley et al. | |

FOREIGN PATENT DOCUMENTS

| | | |
|---|---|---|
| JP | 2014-214698 A | 11/2014 |
| KR | 10-0943726 B1 | 2/2010 |

* cited by examiner

[FIG. 1]
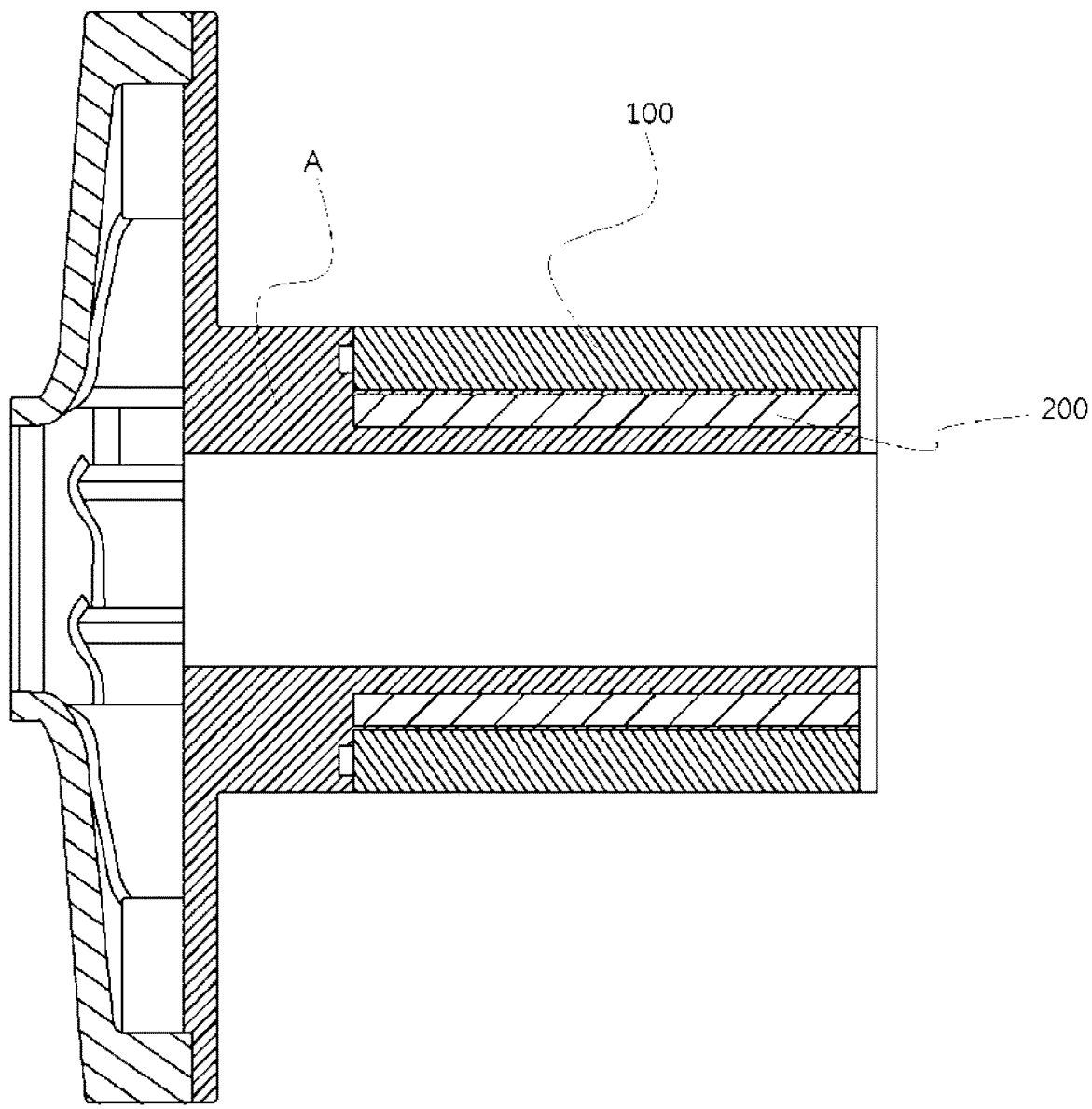

[FIG. 2]
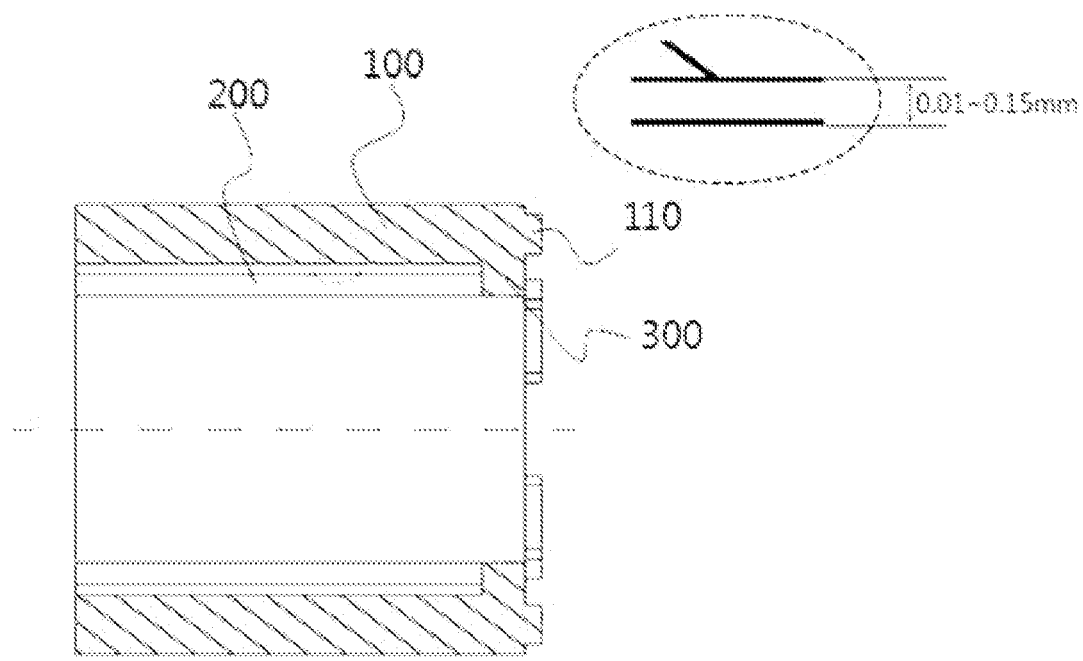

[FIG. 3]
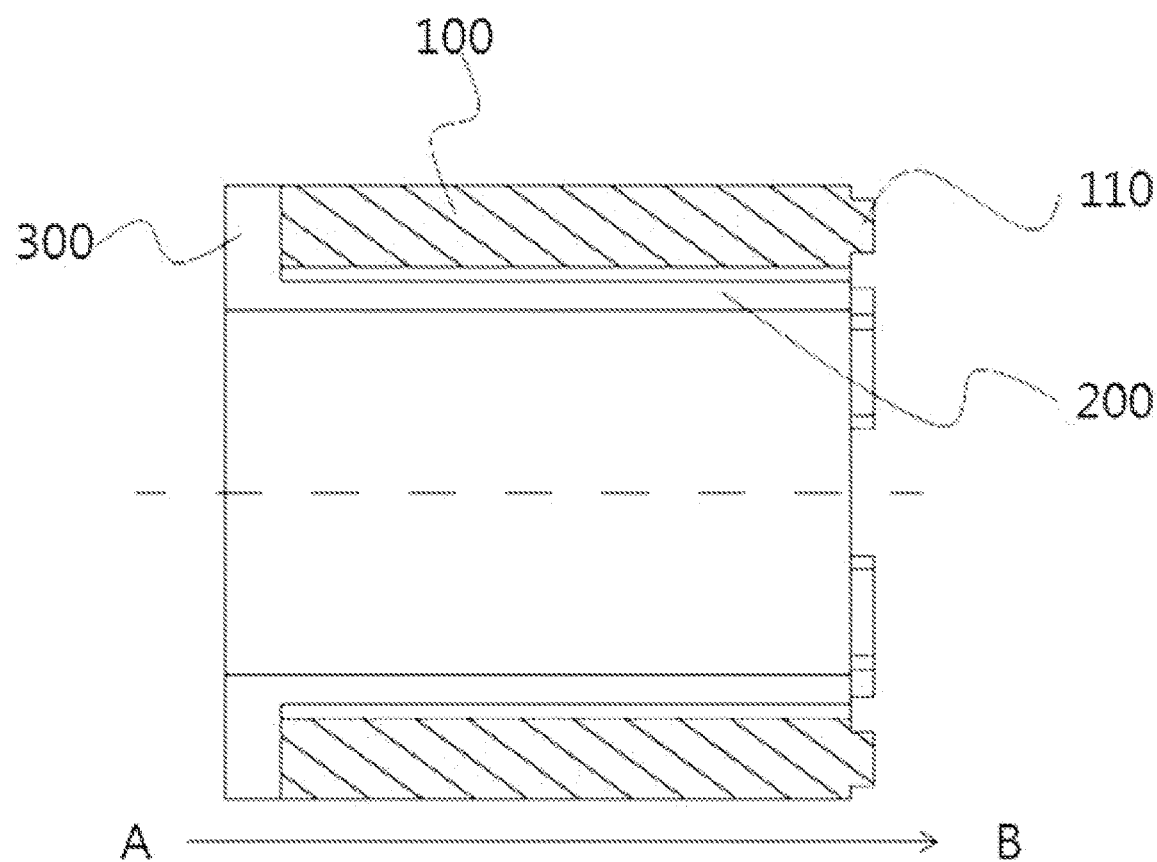

[FIG. 4]
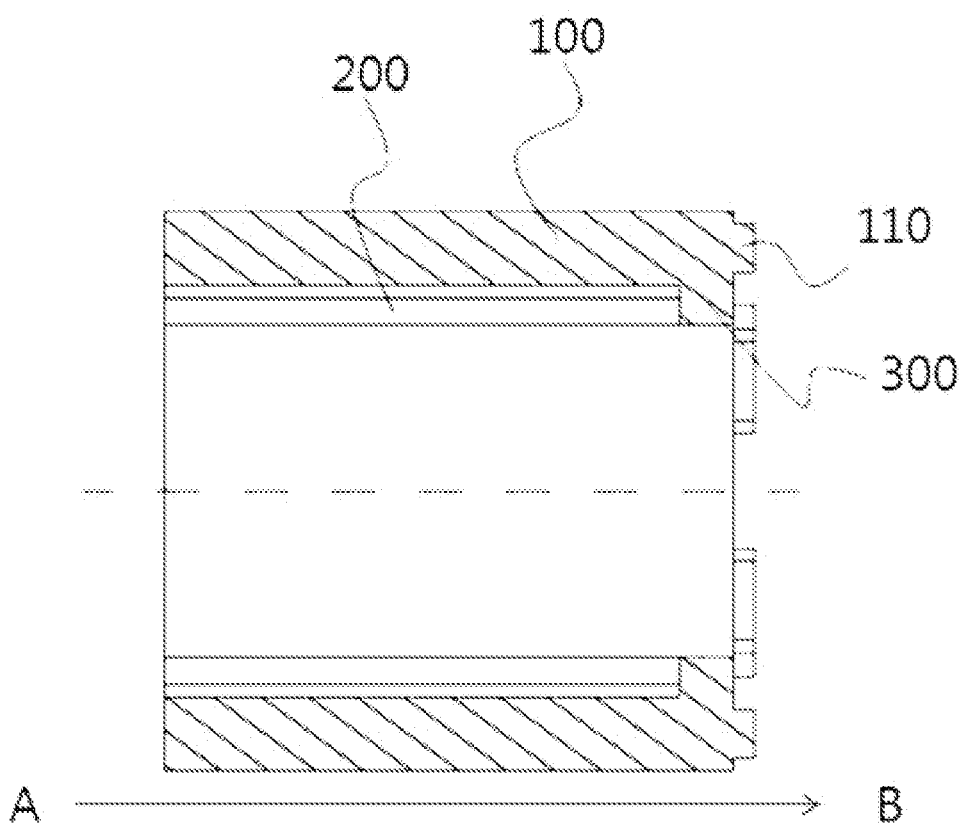

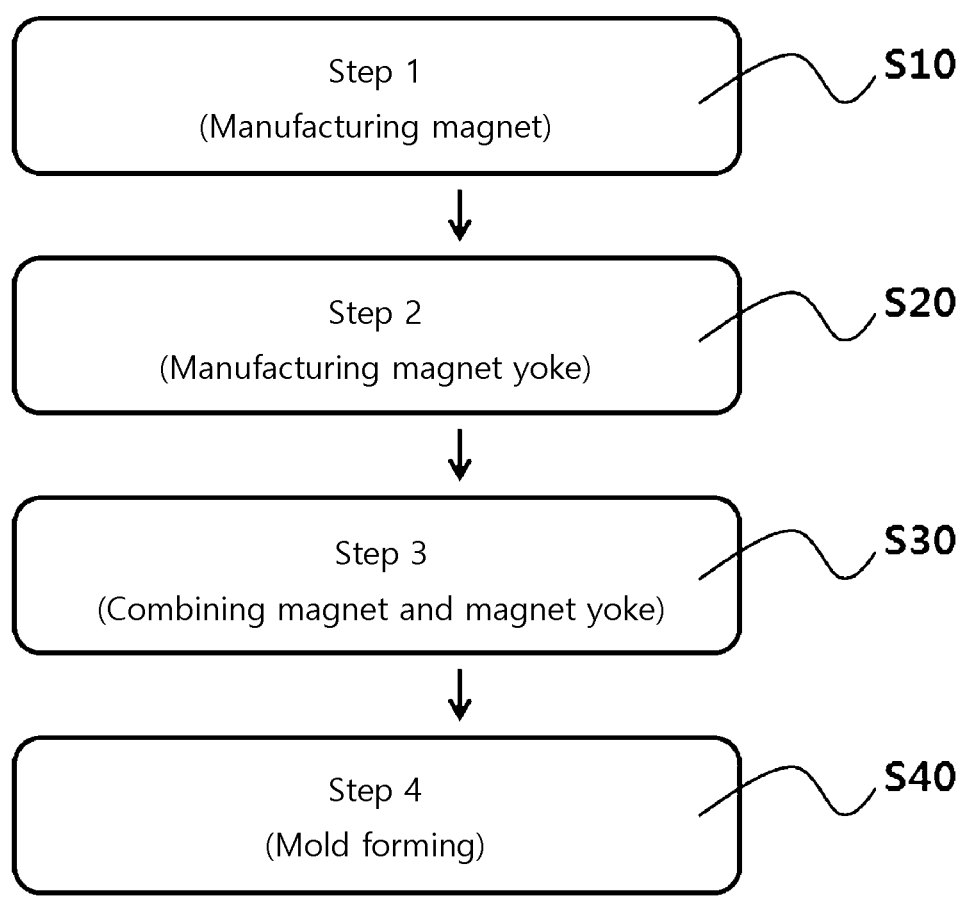

METHOD FOR MANUFACTURING IMPELLER ROTOR ASSEMBLY

CROSS REFERENCE TO PRIOR APPLICATIONS

This application is a National Stage Patent Application of PCT International Patent Application No. PCT/KR2016/002276 (filed on Mar. 8, 2016) under 35 U.S.C. § 371, which claims priority to Korean Patent Application No. 10-2015-0036452 (filed on Mar. 17, 2015), which are all hereby incorporated by reference in their entirety.

BACKGROUND

The present invention relates to a method of manufacturing an impeller rotor assembly. More specifically, the invention relates to a technology used in the manufacture of a rotor assembly integrated with an impeller, whose aim is to prevent cracks on the inner and outer surfaces of a rotor magnet that may occur due to sudden temperature changes during mold forming through the injection of hot molten resin by providing small space between the rotor magnet and the yoke designed to support said magnet.

Conventional impeller rotor assemblies generally used in automotive water pumps are built as an integrated structure comprising a cylindrical magnet with hollow space through which it can be integrated with a rotary shaft, and a magnet yoke and an impeller that are formed in a plastic resin mold.

In this process by which magnets and magnet yokes are produced as integrated structures, when plastic resin is injected to form a mold under high temperature, the outer surface of the magnet cools too quickly and shrinks whereas the inner surface cools relatively slowly, and such cooling speed differences between outer and inner surfaces have resulted in cracks. Furthermore, since the magnet yoke attached to the inner surface of the magnet increases the temperature gradient difference between inner and outer surfaces of the magnet, causing cracks on the magnet surface.

The conventional technology related to the above-described problem is the hot water boiler featuring an impeller assembly with enhanced assembly workability patented under Republic of Korea Patent Registration No. 10-0943726.

In this conventional method intended to enhance workability in the assembly of the impeller and the magnet using a guide apparatus, cracks on the inner circumferential surface of the magnet can be reduced with no mold-forming process. However, the technology involves problems with durability and, due to the way in which its parts are combined, it is not suitable for the impellers used in pumps that require high rotational speeds.

SUMMARY

It is therefore an object of the present invention to solve the above-described problems of the conventional technology by providing a method of manufacturing an impeller rotor assembly designed to prevent the surface defects of a magnet that may occur due to temperature differences between the inner and outer surfaces of the magnet during mold forming through the injection of hot plastic resin.

However, an object to be accomplished by the invention is not limited to the above-mentioned object, and other objects not mentioned will be understood by those skilled in the art from the following description.

The present invention provides a method of manufacturing an impeller rotor assembly including the first step of manufacturing a cylindrical magnet in which hollow space is formed; the second step of manufacturing a magnet yoke which is assembled on the inner circumferential surface of said magnet in cylindrical form where hollow space is provided, and in which an outer diameter is 0.02 to 0.3 mm smaller than the inner diameter of said magnet; the third step of assembling said magnet and magnet yoke; and the fourth step of mold forming in which the assembly of said magnet and magnet yoke is integrated into the mold.

An advantage of the method of manufacturing an impeller rotor assembly according to the present invention is that the method can prevent the surface defects of a magnet that may occur due to temperature differences between the inner and outer surfaces of the magnet during the cooling of the mold formed through the injection of hot plastic resin in the process of manufacturing an impeller rotor assembly.

BRIEF DESCRIPTION OF THE DRAWINGS

FIG. 1 is a plan view showing an impeller rotor assembly according to the present invention.

FIG. 2 is a plan view showing a first embodiment of the assembly of a magnet and a magnet yoke according to the invention and an enlarged view of the coupling portion.

FIG. 3 is a plan view showing a first embodiment of the assembly of a magnet and a magnet yoke according to the invention.

FIG. 4 is a plan view showing a second embodiment of the assembly of a magnet and a magnet yoke according to the invention.

FIG. 5 is a flow chart showing a method of manufacturing the impeller rotor assembly according to the present invention.

DETAILED DESCRIPTION

The above object, the technical problem to be solved, and advantages of the invention are included in the embodiments described below and the accompanying drawings. These, and other features and advantages of the present invention will become apparent from the following description of embodiments read in conjunction with the accompanying drawings.

The following is a detailed description of the present invention with reference to the accompanying drawings:

FIG. 1 shows the overall structure of the invention. FIG. 1 is a plan view showing an impeller rotor assembly according to the invention.

The invention relates to a method of manufacturing an impeller rotor assembly. More specifically, the invention relates to a technology used in the manufacture of a rotor assembly integrated with an impeller, whose aim is to prevent defects such as inner cracks that may occur due to sudden temperature changes during mold forming with hot plastic resin by providing small space between the rotor magnet (100) and the magnet yoke (200) designed to support said magnet and maintain overall stiffness.

The method of manufacturing an impeller rotor assembly according to the present invention comprises the first step of manufacturing a cylindrical magnet (100) in which hollow space is formed; the second step of manufacturing a magnet yoke (200) which is assembled on the inner circumferential surface of said magnet (100) in cylindrical form where hollow space is provided, and in which an outer diameter is 0.02 to 0.3 mm smaller than the inner diameter of said magnet (100); the third step of assembling said magnet (100) and magnet yoke (200); and the fourth step of mold forming in which the assembly of said magnet (100) and magnet yoke (200) is integrated into the mold.

FIG. 5 is a flow chart showing a method of manufacturing the impeller rotor assembly according to the present invention.

In the first step (S10), a cylindrical magnet (100) is manufactured in which hollow space is formed.

More specifically, the magnetic force of the rotor is created in said magnet (100) whose outer diameter is adequate enough for the magnet (100) to be attached to the inner circumferential surface of the aforementioned mold.

In addition, on one end of said magnet (100), protrusions (110) are provided parallel to the rotary shaft.

In other words, multiple protrusions (110) are radially provided on one end of the aforementioned magnet (100).

These are provided for the purpose of effective molding when the aforementioned molten plastic resin (A) is injected in the fourth step (S50) described below, by minimizing the area of contact between said plastic resin (A) and the aforementioned mold and thus securing a passageway for said plastic resin (A). Any shape can be used as long as it helps minimize area of contact with said mold.

Next, in the second step (S20), a magnet yoke (200) is manufactured in cylindrical form in which hollow space is formed, which is assembled in the inner circumferential surface of said magnet (100).

More specifically, said magnet yoke (200) is provided an outer diameter 0.02 to 0.3 mm smaller than the inner diameter of said magnet (100).

This is because a certain clearance should be provided between the inner circumferential surface of said magnet (100) and the outer circumferential surface of said magnet yoke (200) while said magnet (100) and magnet yoke (200) are integrated in the third step described below.

Next, in the third step (S30), said magnet (100) and magnet yoke (200) are assembled.

More specifically, when said magnet (100) and magnet yoke (200) are assembled, a clearance of 0.01 to 0.15 mm is provided between the inner circumferential surface of said magnet (100) and the outer circumferential surface of said magnet yoke (200).

With reference to FIGS. 1 and 2, after the injection of said plastic resin (A), during which the temperatures of said magnet (100) and magnet yoke (200) increase, while the products are being cooled, increased temperature gradients of the surface, on which the magnet (100) is exposed, and the inside of the magnet (100) to which the magnet yoke (200) is attached cause a difference in cooling speed between said magnet (100) and adjacent magnet yoke (200), resulting in cracks on the surface of the magnet (100), and the present method is carried out to prevent such cracks.

As described above, providing a clearance of 0.01 to 0.15 mm between said magnet (100) and magnet yoke (200) helps to prevent surface cracks caused by differences in shrinkage and expansion ratios between the outer circumferential surface and inner circumferential surface of the magnet (100), which may result from the attachment of heterogeneous metals with different temperature gradients during cooling.

If the clearance between the inner circumferential surface of said magnet (100) and the outer circumferential surface of said magnet yoke (200) is less than 0.01 mm, the inadequate clearance cannot be expected to reduce defects caused by the difference of expansion and shrinkage ratios. If the clearance exceeds 0.15 mm, the excessive clearance will allow said plastic resin (A) to penetrate, making it impossible to prevent cracks because enough space cannot be provided between said magnet (100) and magnet yoke (200).

Next, in the fourth step (S40), the assembly of said magnet and magnet yoke is integrated into a mold through mold forming.

More specifically, when molten plastic resin (A) is injected into the aforementioned mold, the aforementioned protrusions formed on said magnet help minimize the area of contact, thus providing a passageway for said plastic resin (A). Through this process, an exterior form can be effectively created through mold forming.

Meanwhile, the clearance between said mold formed through said protrusions (110) and said magnet may be obstructed by said magnet yoke. This is because said magnet yoke can be pushed inward when said plastic resin flows into the mold.

First Embodiment

In order to prevent the above-described problem, on the aforementioned magnet yoke, several more stoppers (300) protruding in the direction opposite to the direction of the rotary shaft can be provided along the outer circumference of one side of the yoke.

When said magnet and magnet yoke are assembled in the third step (S30), they should be assembled so that the stoppers (300) formed on the outer circumferential surface of said magnet yoke (200) on one side is completely fitted by the outer circumferential surface of said magnet (100) on the other side.

With reference to FIG. 3, when molten plastic resin (A) is injected, said plastic resin (A) is injected in the direction A-B. Then, said magnet yoke (200) is pushed inward along with said plastic resin (A) and can be inserted further in A-B direction, namely, the direction of one side of said magnet (100), thereby preventing the above-described problem.

Since the protrusions (110) provided on one side of said magnet (100) provide a passageway for said plastic resin (A) by minimizing the area of contact between said mold and said magnet (100), if said magnet yoke (200) is inserted further in, it obstructs the passageway for said plastic resin (A) and hinders effective mold forming, ultimately making it impossible to form an appropriate exterior form for the impeller rotor assembly.

Second Embodiment

For the above-described reason, on the aforementioned magnet (100), several more stoppers (300) protruding in the direction of the rotary shaft can be provided along the inner circumference of one side of the magnet.

In the third step, said magnet yoke (200) is inserted into the said magnet (100) until the stoppers (300) formed on the said magnet (100) fit with the outer circumferential surface of the magnet yoke (200) on the other side.

With reference to FIG. 4, for the reason similar to one given in the first embodiment, this embodiment is aimed at preventing the magnet yoke (200) from being inserted further in along with said plastic resin (A) in the direction of the magnet (100) on one side. In other words, it is intended to prevent the magnet yoke (200) from going further in A-B direction, namely, the direction of the magnet (100) on one side, by providing the stoppers (300) on the magnet and making them fit in with the outer circumferential surface of the magnet yoke (200) on the other side.

Those skilled in the art will recognize that other variations and modifications can be made to the above-described technology of the present invention without departing from the spirit or essential features of the invention.

Therefore, it should be understood that the above-described preferred embodiments of the invention are given by way of illustration only, not limitation, and that the scope of the invention becomes apparent from the following claims, not the above detailed description. It should be interpreted that various changes and modifications derived from the definition and scope of the claims and their equivalents are included in the scope of the present invention.

The invention claimed is:

1. A method of manufacturing an impeller rotor assembly, comprising,
    manufacturing a cylindrical magnet in which hollow space is formed;
    manufacturing a magnet yoke configured to be assembled on an inner circumferential surface of said cylindrical magnet where hollow space is provided, and having an outer diameter being 0.02 to 0.3 mm smaller than an inner diameter of said cylindrical magnet;
    assembling said cylindrical magnet and magnet yoke by inserting the magnet yoke into said cylindrical magnet with a clearance of 0.01 to 0.15 mm formed between the inner circumferential surface of said cylindrical magnet and an outer circumferential surface of said magnet yoke;
    mold forming in which the assembly of said cylindrical magnet and magnet yoke is integrated into a mold; and
    providing several more stoppers on the magnet yoke outwardly protruding along an outer circumference of one side of the magnet yoke to fit on an end surface of the cylindrical magnet in order to prevent the magnet yoke from being pushed in along with injected plastic resin.

2. A method of manufacturing an impeller rotor assembly, comprising,
    manufacturing a cylindrical magnet in which hollow space is formed;
    manufacturing a magnet yoke configured to be assembled on an inner circumferential surface of said cylindrical magnet where hollow space is provided, and having an outer diameter being 0.02 to 0.3 mm smaller than an inner diameter of said cylindrical magnet;
    assembling said cylindrical magnet and magnet yoke by inserting the magnet yoke into said cylindrical magnet with a clearance of 0.01 to 0.15 mm formed between the inner circumferential surface of said cylindrical magnet and an outer circumferential surface of said magnet yoke;
    mold forming in which the assembly of said cylindrical magnet and magnet yoke is integrated into a mold; and
    providing several protrusions protruding in a direction parallel to a rotary shaft on one end of the cylindrical magnet attached to the mold in order to provide a passageway for molten plastic resin by minimizing an area of contact with said mold.

* * * * *